Dec. 3, 1968  R. D. GORE ETAL  3,413,871
BRAKE OPERATING DEVICE
Filed April 5, 1967  2 Sheets-Sheet 1
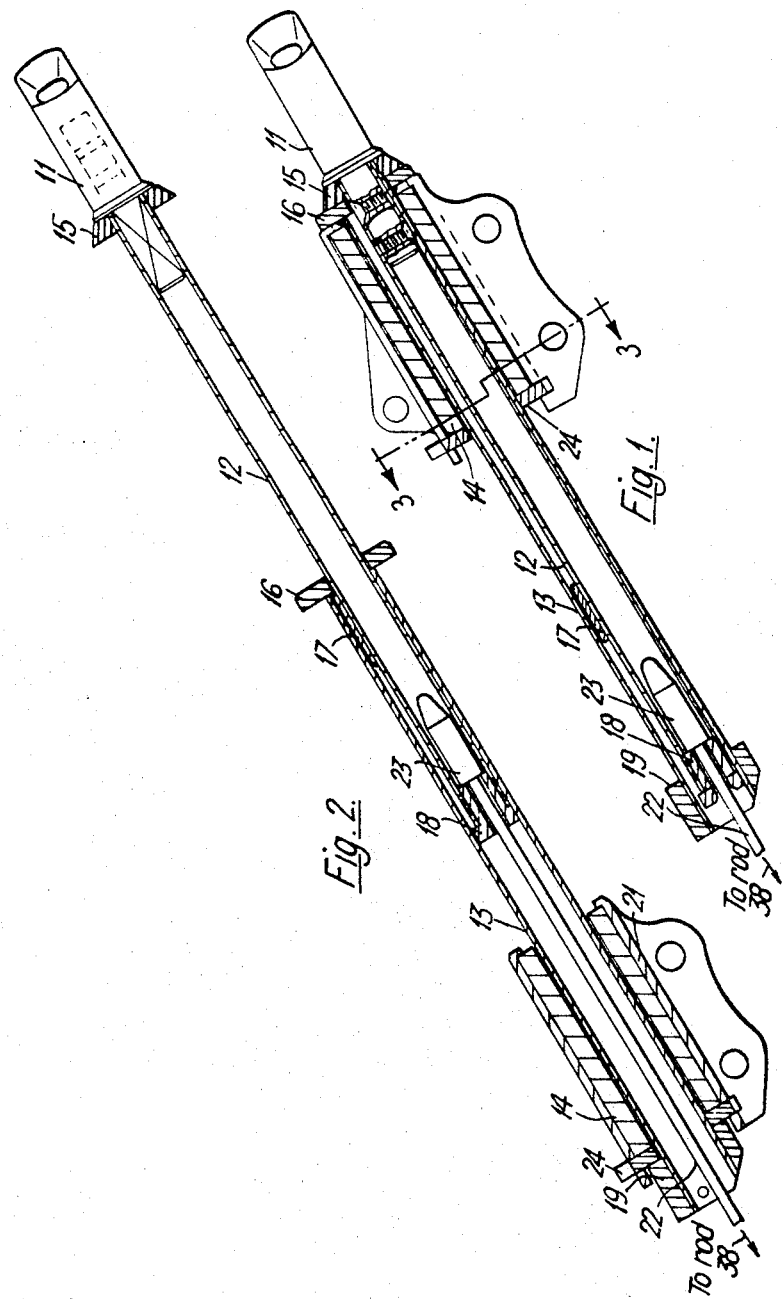
RONALD DAVID GORE
MALCOLM ANTHONY SHARPE
INVENTORS
BY John R. Faulkner
Clifford L. Sadler
ATTORNEYS Dec. 3, 1968     R. D. GORE ETAL     3,413,871
BRAKE OPERATING DEVICE
Filed April 5, 1967     2 Sheets-Sheet 2
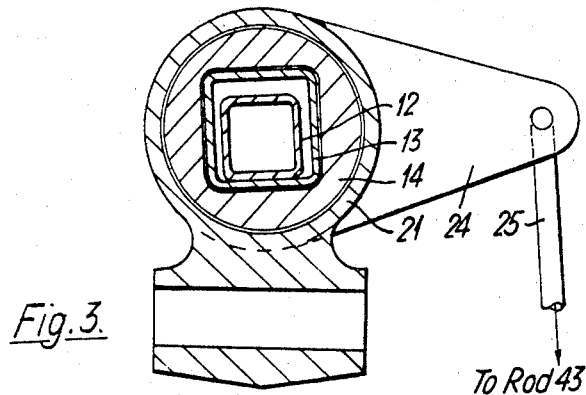
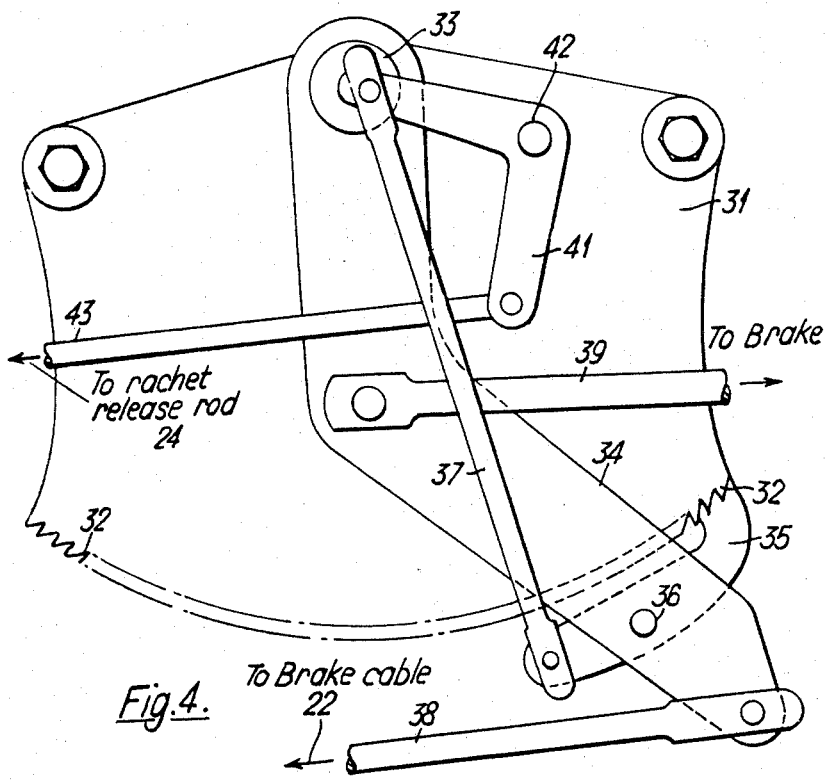
RONALD DAVID GORE
MALCOLM ANTHONY SHARPE
INVENTORS
ATTORNEYS United States Patent Office 3,413,871
Patented Dec. 3, 1968

3,413,871
BRAKE OPERATING DEVICE
Ronald David Gore, Brentwood, and Malcolm Anthony Sharpe, Ilford, England, assignors to Ford Motor Company, Dearborn, Mich., a corporation of Delaware
Filed Apr. 5, 1967, Ser. No. 628,576
Claims priority, application Great Britain, Aug. 17, 1966, 36,734/66
8 Claims. (Cl. 74—536)

ABSTRACT OF THE DISCLOSURE

A motor vehicle parking brake system having a pull device for applying the brake, a ratchet mechanism for holding the brake in an applied position and a lost motion connection between the ratchet and the pull device. The structure permits the pull device to be pushed to an out-of-the-way position without releasing the brake.

Background of the invention

Many motor vehicles have a parking brake system that is operated by hand and is used to hold the vehicle when it is parked. The operating handle is placed in a convenient position for operation by the driver of the vehicle while he is in the driver's seat. The handle is pulled to operate the brake and a ratchet mechanism in the brake linkage holds the handle in the extended brake applied position. Thus, all the time that the vehicle is parked the handle is in its pulled out position. This can be an obstruction to movement of the driver within vehicle. It is particularly objectionable in a delivery truck where the driver is continually moving in and out of the vehicle.

In accordance with the presently preferred embodiment of this invention, the parking brake handle may be moved to a convenient position without releasing the brake.

Brief summary of the invention

A hand brake operating linkage according to this invention has the following characteristics in combination. An operating handle is connected to a pawl and ratchet part of the brake applying linkage by means of a lost motion connection. The operating handle can be moved back to a retracted position when the brake is still applied and a ratchet release linkage is operative to release the ratchet.

Brief description of the drawings

The many objects and advantages of this invention will become apparent from the following description and the accompanying drawings, in which:

FIGURE 1 is a sectional view through part of a brake operating linkage according to the invention.

FIGURE 2 shows the same parts as FIGURE 1, with the parts in the position in which the brakes are being applied.

FIGURE 3 is a sectional view taken on the lines 3—3 of FIGURE 1, and

FIGURE 4 shows another part of the brake linkage.

Detailed description of the invention

Referring now to the drawings for a detailed understanding of the presently preferred embodiment of this invention, FIGURE 1 discloses an operating handle 11 that is mounted on the upper end of a square section tube 12. The tube 12 is slidable within a square section sleeve 13 and the sleeve 13 is slidable within a bush 14. Downward sliding movement of the tube 12 with respect to the sleeve 13 is limited by a rubber buffer 15 secured just below the handle 11 on the tube 12. A collar 16 is welded to the top of the sleeve 13.

Upward sliding movement of the tube 12 with respect to the sleeve 13 is limited by a stop plate 17 welded to one side of the tube 12 and by the collar 16. The lower limit of movement is shown in FIGURE 1 and the upper limit is shown in FIGURE 2. The bearing surface for the sliding movement between the tube 12 and sleeve 13 is the outer periphery of a plug 18 welded into the bottom of the tube 12. The plug 18 slides in the sleeve 13.

Downward sliding movement of the sleeve 13 in the bush 14 is limited by the collar 16 as shown in FIGURE 1. Corresponding upward movement is limited by another collar 19 fixed around the lower end of the sleeve 13.

Relative rotation of the tube 12 in the sleeve 13 and of the sleeve 13 in the bush 14 is prevented by the square cross-sectional configuration of these components as best seen in FIGURE 3. However, the bush 14 is rotatable in a housing 21 that is fixed to the vehicle cab, so that the assembly of handle 11, tube 12, sleeve 13 and bush 14 can rotate in the housing 21.

A brake operating flexible cable 22 passes through a bore in the plug 18 and is confined within tube 12 by virtue of a nipple 23 on the end of the cable. Thus, when the handle 11 is pulled from the position shown in FIGURE 2, the cable 22 is pulled and the brake is applied.

The brake linkage between the tube 12 and the wheel brakes of the vehicle includes a ratchet release arrangement that will now be described. Part of a ratchet release lever 24 surrounds and is a sliding fit on the sleeve 13. The lever is held against axial movement by the housing 21. Due to the square section of the sleeve 12, and a corresponding hole in the lever 24, rotation of the sleeve 13 causes pivotal movements of the lever 24. Thus, when the handle 11 is rotated, for example, through an angle of about 45°, the ratchet release lever 24 is similarly rotated. A release rod 25 is connected to the lever 24 and leads to a pawl and ratchet assembly. It is operative to release the pawl from the ratchet.

FIGURE 4 shows a quadrant 31 that is bolted to the frame of the vehicle. The quadrant carries a row of ratchet teeth 32 arranged in an arc around an arc center 33. A lever 34, pivoted at the center 33, transmits brake application forces from a rod 38 to a rod 39 with a mechanical advantage. The rod 38 is connected through other linkage (not shown) to the brake cable 22 (FIGURES 1 and 2). The lever 34 carries a pawl 35 on a pivot 36. When the brake is applied, the pawl 35 engages the ratchet teeth 32 and holds the brake in the applied condition.

To release the engagement of the pawl and ratchet mechanism, the pawl is rotated out of engagement with the teeth by means of a release link 37. To ensure that the pawl 35 is not pivoted by movement of the lever 34, the release link 37 terminates on the pivotal axis of the lever 34. At this point, the release link 37 is connected to a bell crank 41. The bell crank 41 is pivoted on the quadrant 31 at pivot point 42 so that pulling on a connecting rod 43 operates the release rod 37, link pawl 35 and releases the ratchet mechanism. The connecting rod 43 is connected through linkage (not shown) to the release rod 25 (FIGURE 3) so that when the handle 11 is rotated (thereby operating rod 25) the pawl and ratchet mechanism 35, 32 is disengaged and the brake is released.

To apply the brake, the handle 11 is pulled and the parts shown in FIGURE 1, move toward the position shown in FIGURE 2. Once the brake is applied by tensioning the rod 39, the pawl and ratchet mechanism 35, 32 holds it in the applied state. The handle 11, tube 12 and sleeve 13 can now be pushed back to the position shown in FIGURE 1 without releasing the brake. The lost motion device constituted by the flexibility of the cable 22 or by the fact that the cable 22 can slide through the plug 18, allows the handle to be pushed back without disturbing the lever 24 (FIGURE 4) and subsequent parts of the brake linkage.

To release the brake all that is necessary is to rotate the handle 11 to release or disengage the pawl and ratchet mechanism 35, 32. As this results in a sudden release of the brakes, it may in many cases be unsatisfactory. Alternatively, the handle 11 can again be pulled outwardly until it relieves the load on the pawl 35. The lever is then rotated to disengage the pawl 35 from the ratchet 32 and the brake is released by gradually letting the handle 11 move back to the position shown in FIGURE 1

An advantage of having the quadrant 31 on the vehicle frame instead of on the body structure of the cab is that there is less linkage between the pawl and ratchet mechanism 35, 32 and the brake. This decreases the chance of accidental release of the brake due to distortion of the vehicle between the pawl and ratchet mechanism and the brakes. This is of particular importance in a tilt cab truck, where relative movement between the cab and the frame should not effect the brakes.

The foregoing description constitutes the presently preferred embodiment of this invention. Modifications and alterations may occur to those skilled in the art that will come within the scope and spirit of the following claims.

We claim:

1. A brake operating device comprising a manually activated brake operating member,
   first means interconnecting said operating member and a vehicle brake,
   said operating member being movable from a first position to a second position to apply said brake,
   said first means including a releasable ratchet mechanism constructed to hold said brake in an applied state,
   said first means also including a lost motion connection means interposed between said operating member and said ratchet mechanism and constructed to permit said operating member to move from said second position to said first position without releasing said ratchet mechanism and said brake.

2. A brake operating device according to claim 1 and including:
   release means interconnecting said operating member and said ratchet mechanism and constructed to be activated by said operating member to release said ratchet mechanism while said operating member is in either its said first or second position.

3. A brake operating device according to claim 1 and including:
   said operating member comprising a shaft being axially slidable between said first and second positions,
   a handle connected to one end of said shaft,
   said lost motion connection means connected to the other end of said shaft.

4. A brake operating device according to claim 1 and including:
   release means interconnecting said operating member and said ratchet mechanism and constructed to be activated by said operating member to release said ratchet mechanism while said operating member is in either its said first or second position,
   said operating member comprising a shaft being axially slidable between said first and second positions,
   a handle connected to one end of said shaft,
   said lost motion connection means connected to the other end of said shaft.

5. A brake operating device according to claim 1 and including:
   said lost motion connection means comprising a flexible cable.

6. A brake operating device according to claim 1 and including:
   said operating member comprising a shaft being axially slidable between said first and second positions,
   a handle connected to one end of said shaft,
   said lost motion connection means comprising a flexible cable connected to the other end of said shaft.

7. A brake operating device according to claim 1 and including:
   release means interconnecting said operating member and said ratchet mechanism and constructed to be activated by said operating member to release said ratchet mechanism while said operating member is in either its said first or second position,
   said operating member comprising a shaft being axially slidable between said first and second positions,
   said shaft being rotatably mounted,
   lever means connected to said shaft and to said release means and constructed to activate said release means when said shaft is angularly displaced.

8. A brake operating device according to claim 1 and including:
   release means interconnecting said operating member and said ratchet mechanism and constructed to be activated by said operating member to release said ratchet mechanism while said operating member is in either its said first or second position,
   said operating member comprising a shaft being axially slidable between said first and second positions,
   a handle connected to one end of said shaft,
   said lost motion connection means comprising a flexible cable connected to the other end of said shaft,
   said shaft being rotatably mounted,
   lever means connected to said shaft and to said release means and constructed to activate said release means when said shaft is angularly displaced.

References Cited
UNITED STATES PATENTS

| | | | |
|---|---|---|---|
| 1,078,107 | 11/1913 | Nygren | 74—538 X |
| 1,420,552 | 6/1922 | Klasing. | |
| 1,506,334 | 8/1924 | Bovey | 74—502 |
| 1,178,258 | 6/1929 | Schmidt | 74—502 |
| 2,065,459 | 12/1936 | Jenkins. | |
| 2,160,071 | 5/1939 | Irving | 188—2 X |

FOREIGN PATENTS 495,052  9/1919  France.

FRED C. MATTERN, JR., *Primary Examiner.*

CAROLYN F. GREEN, *Assistant Examiner.*